United States Patent [19]

Kenton

[11] 4,007,029
[45] Feb. 8, 1977

[54] FERTILIZER SOLUTION COMPRISING A TRACE ELEMENT IN LIQUID AMMONIA

[75] Inventor: Joseph R. Kenton, Bartlesville, Okla.

[73] Assignee: Phillips Petroleum Company, Bartlesville, Okla.

[22] Filed: Apr. 17, 1975

[21] Appl. No.: 569,332

[52] U.S. Cl. .................................... 71/11; 71/27; 71/64 C
[51] Int. Cl.² .......................................... C05F 11/00
[58] Field of Search ................. 71/1, 54, 61, 64 C, 71/11, 27, 31; 260/429.9

[56] References Cited

UNITED STATES PATENTS

| | | | |
|---|---|---|---|
| 2,976,138 | 3/1961 | Hester | 71/1 |
| 3,070,434 | 12/1962 | Turner et al. | 71/1 |
| 3,360,355 | 12/1967 | Horsley et al. | 71/61 |
| 3,854,923 | 12/1974 | Ott | 71/1 |

*Primary Examiner*—Frank A. Spear, Jr.
*Assistant Examiner*—Ferris H. Lander

[57] ABSTRACT

A liquid fertilizer composition comprising anhydrous ammonia and at least one trace element selected from the group consisting of B, Cu, Mg, Mn and Mo, plus a method for making such a composition and a method for increasing the trace element content of soils.

28 Claims, No Drawings

FERTILIZER SOLUTION COMPRISING A TRACE ELEMENT IN LIQUID AMMONIA

This invention relates to liquid fertilizers. More particularly, it relates to anhydrous ammoniacal trace element soil additive compositions, their preparation and use for plant nutrient purposes.

Growing plants require six primary elements for growth. These are nitrogen, phosphorus, potassium, oxygen, hydrogen and carbon. They also require small amounts of at least nine additional elements to ensure proper growth, a healthy appearance and satisfactory crop yields. These are iron, copper, magnesium, boron, manganese, molybdenum, zinc, calcium and sulfur. Calcium, magnesium and sulfur are generally required in amounts ranging from 10 to 100 pounds per acre and molybdenum is required in much smaller amounts, e.g., one to two ounces per acre, while the remaining trace elements are usually required in amounts ranging from one-half to two pounds per acre. Plants can live in soil having a trace element deficiency, however any deficiency or deficiencies will be manifested in stunted or deformed growth and decreased crop yields.

The application of nitrogen, phosphorus, or potassium-containing fertilizers will not correct a trace element deficiency. The most efficient and least expensive manner of increasing crop yields is to provide all the necessary primary and secondary nutrients to the plants. There arises, however, a problem of applying small quantities of trace elements to the soils so as to provide uniform distribution.

The trace elements can be uniformly applied to the soils by addition of suitable compounds of the trace elements to liquid fertilizers. An ammoniacal trace element solution can be applied to the soil to supply both trace elements and nitrogen.

It has been proposed that trace element compounds be dissolved in an excess of strong aqueous ammonia (28–30% aqueous ammonium hydroxide) to form ammonium and complex ammonium salts of the trace elements. This method has the disadvantage that the amount of available ammonia in the resulting solution is limited. If it is desired that the nitrogen application rate be higher, the aqueous ammoniacal trace element solution must be supplemented by the application of anhydrous ammonia. It would be desirable to utilize a solution of trace elements in anhydrous ammonia.

Accordingly, it is an object of this invention to provide a liquid fertilizer comprising anhydrous ammonia and at least one trace element.

It is another object of this invention to provide a method of making a liquid fertilizer comprising anhydrous ammonia and at least one trace element.

It is a further object of this invention to provide a method for increasing the trace element content of soils.

Other objects, aspects and advantages will be readily apparent to those skilled in the art from the reading of the following disclosure.

In accordance with the present invention there is provided a liquid fertilizer composition comprising anhydrous ammonia and at least one trace element as available element selected from the group consisting of boron, copper, magnesium, manganese and molybdenum.

As used herein, the term "anhydrous ammonia" and "ammonia" are intended to mean 100 percent ammonia. As explained hereinafter, the final fertilizer composition can contain up to about 5 weight percent water, based on the total weight of ammonia. All quantities expressed herein are in terms of parts by weight per 100 parts by weight of anhydrous ammonia, unless otherwise indicated.

The compositions of this invention are prepared by adding to liquid anhydrous ammonia at least one trace element-containing compound to provide an element selected from the group consisting of boron, copper, magnesium, manganese and molybdenum, and a solubilizing amount of a solubilizer selected from the group consisting of ammonium acetate, ammonium nitrate, magnesium acetate and sodium acetate, wherein when the desired trace element is boron, the boron-containing compound is selected from the group consisting of boric acid and ammonium borate and said solubilizer is ammonium acetate; when the desired trace element is copper, the copper-containing compound is selected from the group consisting of (a) cupric nitrate, (b) cupric acetate, and (c) cuprous chloride, cupric chloride, cuprous bromide and cupric bromide, wherein when said copper source is (b) cupric acetate, said solubilizer is selected from the group consisting of ammonium acetate, sodium acetate, ammonium nitrate, and magnesium acetate, and wherein when said copper source is (c) a cupric or cuprous chloride or bromide, said solubilizer is selected from the group consisting of ammonium nitrate and ammonium acetate; when the desired trace element is manganese, the manganese-containing compound is selected from the group consisting of manganous acetate and manganous nitrate and said solubilizer is selected from the group consisting of ammonium acetate and ammonium nitrate; when the desired trace element is magnesium, the magnesium-containing compound is selected from the group consisting of (a) magnesium acetate, and (b) magnesium formate and magnesium nitrate, wherein when said magnesium source is (b), said solubilizer is ammonium acetate; and, when the desired trace element is molybdenum, the molybdenum-containing compound is selected from the group consisting of molybdenum trioxide and ammonium molybdate and said solubilizer is ammonium acetate and water.

The resulting compositions can be applied directly to the soil to supply both trace elements and nitrogen. No special equipment is necessary for the application of the solution other than a tank and a metering device such as is presently used for application of anhydrous ammonia. The soil additive of this invention is discharged in a trench below the surface of the soil.

The concentration of the trace elements in the anhydrous ammonia can vary widely, depending upon the particular trace element, the extent of solubility of the trace element-containing compound in anhydrous ammonia, the plant which is to utilize the trace element, the extent to which the soil is deficient in the trace element and the rate of application of the ammonia. Similarly, the rate of application of such trace element-containing ammonia compositions to the soil is dependent upon the extent to which the soil is deficient in the trace element or elements, the plant which is to utilize the trace element, the concentration of the trace element in the ammonia and so forth.

The concentrations of trace elements in anhydrous ammonia in accordance with this invention are within the following approximate ranges:

|            | Parts per 100 parts ammonia (by weight) |
|------------|------------------------------------------|
| Manganese  | 0.03–1                                   |
| Molybdenum | 0.005–0.5                                |
| Copper     | 0.03–3                                   |
| Magnesium  | 0.03–2                                   |
| Boron      | 0.03–0.5                                 |

The present invention also provides mixtures of trace elements in anhydrous ammonia. Such mixtures of trace elements can also contain zinc.

In one embodiment of this invention there is provided a liquid fertilizer composition comprising manganese in anhydrous ammonia which can be prepared by adding at least one manganese compound, at least one solubilizer compound and water, as necessary, to anhydrous ammonia. The manganese compound is added in an amount sufficient to provide from about 0.03 to about 1 part by weight of manganese, calculated as the element. The solubilizer is added in an amount sufficient to increase the solubility and/or stability of the manganese compound in the ammonia. The amount of solubilizer can vary widely but will generally be within the range of about 1 to about 20 parts by weight. The amount of water, if used, will range up to 5 parts by weight.

The manganese compound can be used in its anhydrous form, although it is presently preferred that the hydrated form be used, or that it be used together with free water in an amount up to about twice the weight of manganous salt, as expressed in the anhydrous form.

In another embodiment of this invention there is provided a liquid fertilizer composition comprising molybdenum in anhydrous ammonia which can be prepared by adding molybdenum trioxide or ammonium molybdate, ammonium acetate and a minor amount of water to anhydrous ammonia. The molybdenum compound is added in an amount sufficient to provide from about 0.005 to about 0.5 part by weight of molybdenum, calculated as the element, per 100 parts by weight of ammonia. The amount of solubilizer can vary widely but will generally be within the range of about 1 to about 20 parts by weight per 100 parts by weight of ammonia. The water is added in an amount ranging up to 5 parts by weight per 100 parts by weight of ammonia.

In yet another embodiment of this invention there is provided a liquid fertilizer composition comprising copper in anhydrous ammonia which can be prepared by adding a copper compound and at least one solubilizer to anhydrous ammonia. The copper compound can be used in its anhydrous form or its hydrated form. The copper compound is added in an amount sufficient to provide from about 0.03 to about 3 parts by weight of copper, calculated as the element. The amount of solubilizer can vary widely, but will generally be within the range of about 1 to about 20 parts by weight for ammonium nitrate or ammonium acetate, and from about 1 to about 10 parts by weight for sodium acetate or magnesium acetate. It will be appreciated that when the copper compound is cupric nitrate, no solubilizer is required.

In a further embodiment of this invention there is provided a liquid fertilizer composition comprising magnesium in anhydrous ammonia which can be prepared by adding a magnesium compound and at least one solubilizer to anhydrous ammonia. It will be appreciated that when magnesium acetate is used as the magnesium source, no solubilizer is required since magnesium acetate is itself a solubilizer for other metal compounds. Preferably, the magnesium compound is used in hydrated form. The magnesium compound is added in an amount sufficient to provide from about 0.03 to about 2 parts by weight of magnesium, calculated as the element. The amount of solubilizer can vary widely but will generally be within the range of about 1 to about 20 parts by weight.

In a yet further embodiment of this invention, there is provided a liquid fertilizer composition comprising boron in anhydrous ammonia, which can be prepared by adding a boron compound, such as boric acid or ammonium borate and ammonium acetate to anhydrous ammonia. The boron compound is added in an amount sufficient to provide from about 0.03 to about 0.5 part by weight of boron, calculated as the element. The amount of solubilizer can vary widely but will generally be within the range of about 1 to about 20 parts by weight per 100 parts by weight of ammonia.

Mixing of the ingredients of the fertilizer compositions can be conducted in any convenient manner, e.g., at ambient temperature under sufficient pressure to maintain the ammonia substantially in the liquid phase, with stirring or other means of agitation.

The following example illustrates the invention.

EXAMPLE

A series of compositions were prepared by placing a weighed quantity of the compound under test in an empty aerosol compatibility tube and assembling the compatibility apparatus. A protective wire mesh screen was installed, the apparatus was evacuated, and the glass tube was cooled in an ice bath. Thirty grams of anhydrous liquid ammonia were charged to the compatibility tube. The tube was agitated and observed to determine the solubility of the compound under test in liquid ammonia at 75° F (125 psig). Solubilities were determined at temperatures between room temperature and −28° F by venting ammonia gas from the compatibility tube and equilibrating the system at the pressure corresponding to the desired temperature. The relationships between temperature and vapor pressure of liquid ammonia is given in the Handbook of Chemistry and Physics, 54th edition, CRC Press, Cleveland, Ohio, 1973, pages E-27 to -28. The results of these tests are shown in the following tables. The table headings and results are self-explanatory.

Table I

Compounds Useful as Solubilizing Agents for Trace Element-Containing Compounds in Liquid Anhydrous Ammonia

| Compound | lb/100 lb $NH_3$ | Equivalent to lb metal/100 lb $NH_3$ | Comments |
|---|---|---|---|
| $NH_4(C_2H_3O_2)$ | 20.60 | — | Soluble at −28° F |
| $NH_4NO_3$ | 6.67 | — | Soluble at 70° F |
| $Mg(C_2H_3O_2)_2 \cdot 4H_2O$ | 8.80 | 1.0 lb Mg | Soluble at −28° F |

Table I-continued
Compounds Useful as Solubilizing Agents for Trace Element-Containing Compounds in Liquid Anhydrous Ammonia

| Compound | lb/100 lb $NH_3$ | Equivalent to lb metal/100 lb $NH_3$ | Comments |
|---|---|---|---|
| $Na(C_2H_3O_2).3H_2O$ | 5.00 | — | Soluble at 32° F |

Note:
The maximum solubilities of these compounds were not determined.

Table II
Solubility of Boric Acid in Anhydrous Liquid Ammonia

| Compound | lb/100 lb $NH_3$ | Equivalent to lb boron 100 lb $NH_3$ | Comments |
|---|---|---|---|
| $H_3BO_3$ | 1.67 | 0.29 lb B | Insoluble at 70° F |
| $H_3BO_3$ | 1.44 | 0.25 lb B | Soluble at 70° F, 10°F, −28° F |
| $NH_4(C_2H_3O_2)$ | 10.00 | | |
| $H_3BO_3$ | 1.43 | 0.25 lb B | Insoluble at 70° F |
| $NH_4NO_3$ | 10.00 | | |

Table III
Solubility of Copper Compounds in Anhydrous Liquid Ammonia

| Compound | lb/100 lb $NH_3$ | Equivalent to lb metal/100 lb $NH_3$ | Comments |
|---|---|---|---|
| $Cu(C_2H_3O_2)_2.H_2O$ | 1.57 | 0.5 lb Cu | Some solubility at 70° F but considerable precipitate present. |
| $Cu(C_2H_3O_2)_2.H_2O$ | 1.57 | 0.5 lb Cu | Soluble at −28° F |
| $NH_4(C_2H_3O_2)$ | 10.00 | | |
| $Cu(C_2H_3O_2)_2.H_2O$ | 6.26 | 2.0 lb Cu | Soluble at 70° F |
| $NH_4(C_2H_3O_2)$ | 10.00 | | |
| $Cu(C_2H_3O_2)_2.H_2O$ | 3.13 | 1.0 lb Cu | Soluble at 70° F |
| $NH_4NO_3$ | 10.00 | | |
| $Cu(C_2H_3O_2)_2.H_2O$ | 1.57 | 0.5 lb Cu | Soluble at −28° F |
| $Mg(C_2H_3O_2)_2.4H_2O$ | 8.80 | 1.0 lb Mg | |
| $Cu(C_2H_3O_2)_2.H_2O$ | 1.57 | 0.5 lb Cu | Soluble at 70° F |
| $Na(C_2H_3O_2).3H_2O$ | 5.00 | | |
| $CuBr_2$ | 1.77 | 0.5 lb Cu | Insoluble at 70° F |
| $CuBr_2$ | 1.77 | 0.5 lb Cu | Soluble at 70° F |
| $NH_4(C_2H_3O_2)$ | 10.00 | | |
| $CuBr_2$ | 1.77 | 0.5 lb Cu | Soluble at 70° F |
| $NH_4NO_3$ | 10.00 | | |
| $CuCl$ | 0.77 | 0.5 lb Cu | Insoluble at 70° F |
| $CuCl$ | 0.77 | 0.5 lb Cu | Soluble at 70° F |
| $NH_4(C_2H_3O_2)$ | 10.00 | | |
| $CuCl$ | 0.77 | 0.5 lb Cu | Soluble at 70° F |
| $NH_4NO_3$ | 10.00 | | |
| $CuCl_2.2H_2O$ | 1.33 | 0.5 lb Cu | Insoluble at 70° F |
| $CuCl_2.2H_2O$ | 1.33 | 0.5 lb Cu | Soluble at 70° F |
| $NH_4(C_2H_3O_2)$ | 10.00 | | |
| $CuCl_2.2H_2O$ | 1.33 | 0.5 lb Cu | Soluble at 70° F |
| $NH_4NO_3$ | 10.00 | | |
| $Cu(NO_3)_2.3H_2O$ | 1.90 | 0.5 lb Cu | Soluble at 70° F |

Table IV
Solubility of Magnesium Compounds in Anhydrous Liquid Ammonia

| Compound | lb/100 lb $NH_3$ | Equivalent to lb metal/100 lb $NH_3$ | Comments |
|---|---|---|---|
| $Mg(NO_3)_2.6H_2O$ | 5.27 | 0.5 lb Mg | Insoluble at 70° F |
| $Mg(NO_3)_2.6H_2O$ | 5.27 | 0.5 lb Mg | Soluble at 75° F |
| $NH_4(C_2H_3O_2)$ | 10.00 | | |
| $Mg(CHO_2)_2.2H_2O$ | 3.10 | 0.5 lb Mg | Insoluble at 75° F |
| $Mg(CHO_2)_2.2H_2O$ | 3.10 | 0.5 lb Mg | Soluble at 75° F |
| $NH_4(C_2H_3O_2)$ | 10.00 | | |
| $Mg(C_2H_3O_2)_2.4H_2O$ | 4.40 | 0.5 lb Mg | Soluble at 70° F |
| $Mg(C_2H_3O_2)_2.4H_2O$ | 8.80 | 1.0 lb Mg | Soluble at −28° F |

Table V

Solubility of Manganese Compounds in Anhydrous Liquid Ammonia

| Compound | lb/100 lb $NH_3$ | Equivalent to lb metal/100 lb $NH_3$ | Comments |
| --- | --- | --- | --- |
| $Mn(C_2H_3O_2)_2 \cdot 4H_2O$ | 2.23 | 0.5 lb Mn | Black, finely divided precipitate at 70° F |
| $Mn(C_2H_3O_2)_2 \cdot 4H_2O$ $NH_4(C_2H_3O_2)$ | 2.23 10.00 | 0.5 lb Mn | Colorless stable solution at 70° F |
| $Mn(NO_3)_2$, 50% solution in water | 3.27 | 0.5 lb Mn | Insoluble at 75° F |
| $Mn(NO_3)_2$, 50% solution in water $NH_4NO_3$ | 3.27 10.00 | 0.5 lb Mn | Soluble at 75° F |
| $Mn(NO_3)_2$, 50% solution in water $NH_4(C_2H_3O_2)$ | 3.27 10.00 | 0.5 lb Mn | Soluble at 75° F |

Table VI

Solubility of Molybdenum Compounds in Anhydrous Liquid Ammonia

| Compound | lb/100 lb $NH_3$ | Equivalent to lb metal/100 lb $NH_3$ | Comments |
| --- | --- | --- | --- |
| $(NH_4)_2MoO_4$ | 1.83 | 0.9 lb Mo | Insoluble at 70° F |
| $(NH_4)_2MoO_4$ $H_2O$ | 0.50 3.33 | 0.25 lb Mo | Insoluble at 70° F |
| $(NH_4)_2MoO_4$ $NH_4(C_2H_3O_2)$ $H_2O$ | 0.50 10.00 3.33 | 0.25 lb Mo | Soluble at 70° F |

Table VII

Mixtures of Trace Elements in Anhydrous Liquid Ammonia

| Compound | lb/100 lb $NH_3$ | Equivalent to lb metal/100 lb $NH_3$ | Comments |
| --- | --- | --- | --- |
| $Cu(C_2H_3O_2)_2 \cdot H_2O$ | 0.16 | 0.05 lb Cu | |
| $Mg(C_2H_3O_2)_2 \cdot 4H_2O$ | 0.44 | 0.05 lb Mg | |
| $Mn(C_2H_3O_2)_2 \cdot 4H_2O$ | 0.22 | 0.05 lb Mn | Soluble at 70° F |
| $Zn(C_2H_3O_2)_2 \cdot 2H_2O$ | 0.17 | 0.05 lb Zn | |
| $NH_4(C_2H_3O_2)$ | 1.67 | | |
| $Cu(NO_3)_2 \cdot 3H_2O$ | 1.90 | 0.5 lb Cu | |
| $Mg(C_2H_3O_2)_2 \cdot 4H_2O$ | 4.40 | 0.5 lb Mg | |
| $Mn(C_2H_3O_2)_2 \cdot 4H_2O$ | 2.23 | 0.5 lb Mn | Soluble at 75° F and −28° F |
| $Zn(C_2H_3O_2)_2 \cdot 2H_2O$ | 1.67 | 0.5 lb Zn | |
| $NH_4(C_2H_3O_2)$ | 10.00 | | |
| $Cu(C_2H_3O_2)_2 \cdot H_2O$ | 0.33 | 0.1 lb Cu | |
| $Mn(C_2H_3O_2)_2 \cdot 4H_2O$ | 2.23 | 0.5 lb Mn | Very soluble at 70° F |
| $NH_4NO_3$ | 6.67 | | |
| $Cu(C_2H_3O_2)_2 \cdot H_2O$ | 1.57 | 0.5 lb Cu | Soluble at −28° F |
| $Mg(C_2H_3O_2)_2 \cdot 4H_2O$ | 8.80 | 1.0 lb Mg | |

Reasonable variations and modifications, which will be apparent to those skilled in the art, can be made in this invention without departing from the spirit and scope thereof.

What is claimed is:

1. A method of making a liquid fertilizer which comprises adding to anhydrous ammonia at least one trace element-containing compound to provide an available element selected from the group consisting of B, Cu, Mn, Mg and Mo, and a solubilizing amount of a solubilizer wherein:
    1. when the desired trace element is boron, the boron-containing compound is selected from the group consisting of boric acid and ammonium borate and said solubilizer is ammonium acetate;
    2. when the desired trace element is copper, the copper-containing compound is selected from the group consisting of
        a. cupric nitrate,
        b. cupric acetate, and
        c. cuprous chloride, cupric chloride, cuprous bromide and cupric bromide, wherein when said copper source is (b) cupric acetate, said solubilizer is selected from the group consisting of ammonium nitrate, sodium acetate, ammonium acetate and magnesium acetate, and wherein when said copper source is (c) a cupric or cuprous chloride or bromide, said solubilizer is selected from the group consisting of ammonium nitrate and ammonium acetate;
    3. when the desired trace element is manganese, the manganese-containing compound is selected from the group consisting of manganous acetate and manganous nitrate and said solubilizer is selected from the group consisting of ammonium acetate and ammonium nitrate;
    4. when the desired trace element is magnesium, the magnesium-containing compound is selected from the group consisting of
        a. magnesium acetate, and
        b. magnesium formate and magnesium nitrate, wherein when said magnesium source is (b), said solubilizer is ammonium acetate;

5. and, when the desired trace element is molybdenum, the molybdenum-containing compound is selected from the group consisting of molybdenum trioxide and ammonium molybdate and said solubilizer is ammonium acetate and water.

2. The method of claim 1 which additionally comprises adding zinc acetate to said anhydrous ammonia.

3. The method of claim 2 which comprises adding to and dissolving in 100 parts by weight of anhydrous ammonia the following trace element compounds and ammonium acetate, as solubilizer, in approximately the following amounts:
0.16 part by weight of cupric acetate monohydrate,
0.44 part by weight of magnesium acetate tetrahydrate,
0.22 part by weight of manganous acetate tetrahydrate,
0.17 part by weight of zinc acetate dihydrate, and
1.67 parts by weight of ammonium acetate.

4. The method of claim 1 wherein said boron-containing compound is present in an approximate amount equivalent to 0.03 to 0.5 part by weight of boron and said solubilizer is present in an amount ranging from 1 to 20 parts by weight.

5. The method of claim 1 wherein said molybdenum-containing compound is present in an approximate amount equivalent to 0.005 to 0.5 part by weight of molybdenum, said solubilizer is present in an amount ranging from 1 to 20 parts by weight and said water is present in an amount ranging up to about 5 parts by weight.

6. The method of claim 1 wherein said magnesium-containing compound is present in an approximate amount equivalent to 0.03 to 2 parts by weight of magnesium and said solubilizer is present in an amount ranging from 1 to 20 parts by weight.

7. The method of claim 1 wherein said manganese-containing compound is present in an approximate amount equivalent to 0.03 to 1 part by weight of manganese, said solubilizer is present in an amount ranging from 1 to 20 parts by weight and said water is present in an amount ranging up to 5 parts by weight.

8. The method of claim 1 wherein said copper-containing compound is present in an approximate amount equivalent to 0.03 to 3 parts by weight, wherein when said solubilizer is magnesium acetate or sodium acetate, the amount employed is from 1 to 10 parts by weight and when said solubilizer is ammonium nitrate or ammonium acetate, the amount employed is from 1 to 20 parts by weight.

9. The method of claim 1 which comprises adding to and dissolving in 100 parts by weight of anhydrous ammonia the following trace element compounds and ammonium nitrate, as solubilizer, in approximately the following amounts:
0.33 part by weight of cupric acetate monohydrate,
2.23 parts by weight of manganous acetate tetrahydrate, and
6.67 parts by weight of ammonia nitrate.

10. The method of claim 1 which comprises adding to and dissolving in 100 parts by weight of anhydrous ammonia the following trace element compounds in approximately the following amounts:
1.57 parts by weight of cupric acetate monohydrate and
8.80 parts by weight of magnesium acetate tetrahydrate.

11. The method of claim 2 which comprises adding to and dissolving in 100 parts by weight of anhydrous ammonia the following trace element compounds and ammonium acetate, as solubilizer, in approximately the following amounts:
1.90 parts by weight of cupric nitrate trihydrate,
4.40 parts by weight of magnesium acetate tetrahydrate,
2.23 parts by weight of manganous acetate tetrahydrate,
1.67 parts by weight of zinc acetate dihydrate, and
10.00 parts by weight of ammonium acetate.

12. A liquid-fertilizer composition comprising anhydrous ammonia, at least one trace element-containing compound to provide an available element selected from the group consisting of boron, copper, magnesium, manganese and molybdenum, and a solubilizer, as hereinafter defined, wherein
1. when said trace element is boron, said boron-containing compound is selected from the group consisting of boric acid and ammonium borate and said solubilizer is ammonium acetate;
2. when said trace element is copper, said copper-containing compound is selected from the group consisting of
   a. cupric nitrate,
   b. cupric acetate, and
   c. cupric chloride, cuprous chloride, cupric bromide and cuprous bromide
   wherein when said copper source is cupric acetate, said solubilizer is selected from the group consisting of ammonium nitrate, sodium acetate, ammonium acetate and magnesium acetate, and wherein when said copper source is a cupric or cuprous chloride or bromide, said solubilizer is selected from the group consisting of ammonium nitrate and ammonium acetate;
3. when said trace element is manganese, said manganese-containing compound is selected from the group consisting of manganous acetate and manganous nitrate wherein when said manganese-containing compound is manganous acetate, said solubilizer is ammonium acetate and when said manganese-containing compound is manganous nitrate, said solubilizer is selected from the group consisting of ammonium acetate and water, and ammonium nitrate and water;
4. when said trace element is magnesium, said magnesium-containing compound is selected from the group consisting of
   a. magnesium acetate, and
   b. magnesium formate, wherein when said magnesium source is (b), said solubilizer is ammonium acetate; and
5. when said trace element is molybdenum, said molybdenum-containing compound is selected from the group consisting of molybdenum trioxide and ammonium molybdate and said solubilizer is ammonium acetate and water.

13. The composition of claim 12 additionally containing zinc acetate.

14. A composition in accordance with claim 13 consisting essentially of anhydrous ammonia, at least one of said copper compounds, magnesium acetate, manganese acetate, zinc acetate and ammonium acetate.

15. The composition of claim 12 wherein said boron-containing compound is present in an approximate amount equivalent to 0.03 to 0.5 part by weight of boron and said solubilizer is present in an amount ranging from 1 to 20 parts by weight.

16. The composition of claim 12 wherein said molybdenum-containing compound is present in an approximate amount equivalent to 0.005 to 0.5 part by weight of molybdenum, said solubilizer is present in an amount ranging from 1 to 20 parts by weight and said water is present in an amount ranging up to about 5 parts by weight.

17. The composition of claim 12 wherein said magnesium-containing compound is present in an approximate amount equivalent to 0.03 to 2 parts by weight of magnesium and said solubilizer is present in an amount ranging from 1 to 20 parts by weight.

18. The composition of claim 12 wherein said manganese-containing compound is present in an approximate amount equivalent to 0.03 to 1 part by weight of manganese, said solubilizer is present in an amount ranging from 1 to 20 parts by weight and said water is present in an amount ranging up to 5 parts by weight.

19. The composition of claim 12 wherein said copper-containing compound is present in an approximate amount equivalent to 0.03 to 3 parts by weight, wherein when said solubilizer is magnesium acetate or sodium acetate, the amount present ranges from 1 to 10 parts by weight, and when said solubilizer is ammonium nitrate or ammonium acetate, the amount present ranges from 1 to 20 parts by weight.

20. A composition in accordance with claim 12 consisting essentially of anhydrous ammonia, cupric acetate, manganese acetate and ammonium nitrate.

21. A composition in accordance with claim 12 consisting essentially of anhydrous ammonia, cupric acetate and magnesium acetate.

22. A method of increasing the trace element content of soils which comprises applying below the surface of the soil the liquid fertilizer composition defined by claim 12.

23. The method of claim 22 wherein said liquid fertilizer composition additionally contains zinc acetate.

24. The method of claim 22 wherein said boron-containing compound is present in an approximate amount equivalent to 0.03 to 0.5 part by weight of boron and said solubilizer is present in an amount ranging from 1 to 20 parts by weight.

25. The method of claim 22 wherein said molybdenum-containing compound is present in an approximate amount equivalent to 0.005 to 0.5 part by weight of molybdenum, said solubilizer is present in an amount ranging from 1 to 20 parts by weight and said water is present in an amount ranging up to about 5 parts by weight.

26. The method of claim 22 wherein said magnesium-containing compound is present in an approximate amount equivalent to 0.03 to 2 parts by weight of magnesium and said solubilizer is present in an amount ranging from 1 to 20 parts by weight.

27. The method of claim 22 wherein said manganese-containing compound is present in an approximate amount equivalent to 0.03 to 1 part by weight of manganese, said solubilizer is present in an amount ranging from 1 to 20 parts by weight and said water is present in an amount ranging up to 5 parts by weight.

28. The method of claim 22 wherein said copper-containing compound is present in an approximate amount equivalent to 0.03 to 3 parts by weight, wherein when said solubilizer is magnesium acetate or sodium acetate, the amount present ranges from 1 to 10 parts by weight, and when said solubilizer is ammonium nitrate or ammonium acetate, the amount present ranges from 1 to 20 parts by weight.

* * * * *